US009314696B2

(12) United States Patent
Lucero et al.

(10) Patent No.: US 9,314,696 B2
(45) Date of Patent: Apr. 19, 2016

(54) METHOD AND APPARATUS FOR LEVERAGING OVERLAPPING GROUP AREAS

(71) Applicant: Nokia Corporation, Espoo (FI)

(72) Inventors: Andrés Lucero, Tampere (FI); Petri Piippo, Lempaala (FI); Juha Arrasvuori, Tampere (FI); Marion Boberg, Suinula (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 325 days.

(21) Appl. No.: 13/785,879

(22) Filed: Mar. 5, 2013

(65) Prior Publication Data

US 2014/0258394 A1 Sep. 11, 2014

(51) Int. Cl.
*G06F 15/16* (2006.01)
*A63F 13/216* (2014.01)
*H04W 4/02* (2009.01)
*H04W 4/08* (2009.01)
*A63F 13/332* (2014.01)

(52) U.S. Cl.
CPC .............. *A63F 13/216* (2014.09); *A63F 13/332* (2014.09); *H04W 4/023* (2013.01); *H04W 4/028* (2013.01); *H04W 4/08* (2013.01)

(58) Field of Classification Search
CPC ......... H04L 67/10; H04L 67/18; H04L 67/22; H04L 65/403; H04L 51/046
USPC ........................................................ 709/204
See application file for complete search history.

(56) References Cited

U.S. PATENT DOCUMENTS

| | | | |
|---|---|---|---|
| 2006/0121906 A1* | 6/2006 | Stephens et al. | 455/446 |
| 2007/0156883 A1* | 7/2007 | Thompson et al. | 709/223 |
| 2007/0237096 A1* | 10/2007 | Vengroff et al. | 370/254 |
| 2012/0284638 A1* | 11/2012 | Cutler et al. | 715/751 |
| 2013/0013697 A1* | 1/2013 | Tsuchida | 709/204 |
| 2013/0018960 A1* | 1/2013 | Knysz et al. | 709/204 |
| 2013/0194999 A1* | 8/2013 | Anchan | 370/312 |
| 2013/0196773 A1* | 8/2013 | Lockeby et al. | 463/42 |
| 2013/0198191 A1* | 8/2013 | Lara Hernandez et al. | 707/737 |
| 2013/0225205 A1* | 8/2013 | Haney | 455/456.3 |
| 2014/0113674 A1* | 4/2014 | Joseph et al. | 455/519 |
| 2014/0229539 A1* | 8/2014 | Powers | 709/204 |
| 2014/0242966 A1* | 8/2014 | Keating et al. | 455/418 |
| 2014/0250191 A1* | 9/2014 | Altman et al. | 709/204 |

\* cited by examiner

*Primary Examiner* — Douglas Blair
(74) *Attorney, Agent, or Firm* — Ditthavong & Steiner, P.C.

(57) ABSTRACT

An approach is provided for determining a group of users based on the overlapping area of two or more existing groups and providing services and/or content to the group based on the services and content of the existing groups. An interaction platform determines shapes of groups based, at least in part, on location information associated with one or more member devices of the groups. The interaction platform causes, at least in part, a presentation of one or more representations of the shapes in a location-based user interface. The interaction platform determines one or more applications, one or more content items, or a combination thereof being used at the one or more member devices. The interaction platform causes, at least in part, a presentation of one or more other representations of the one or more applications, the one or more content items, or a combination thereof in the location-based user interface.

16 Claims, 10 Drawing Sheets

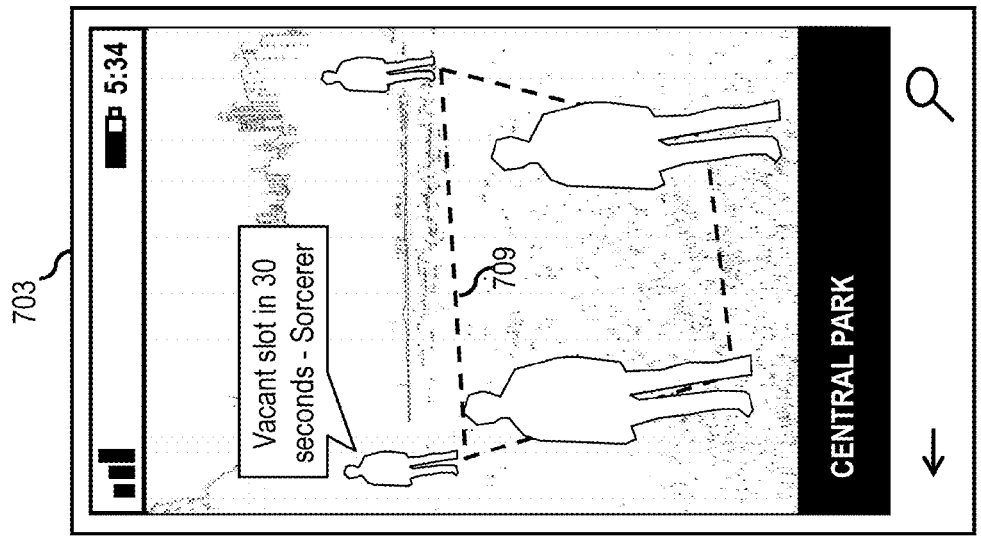
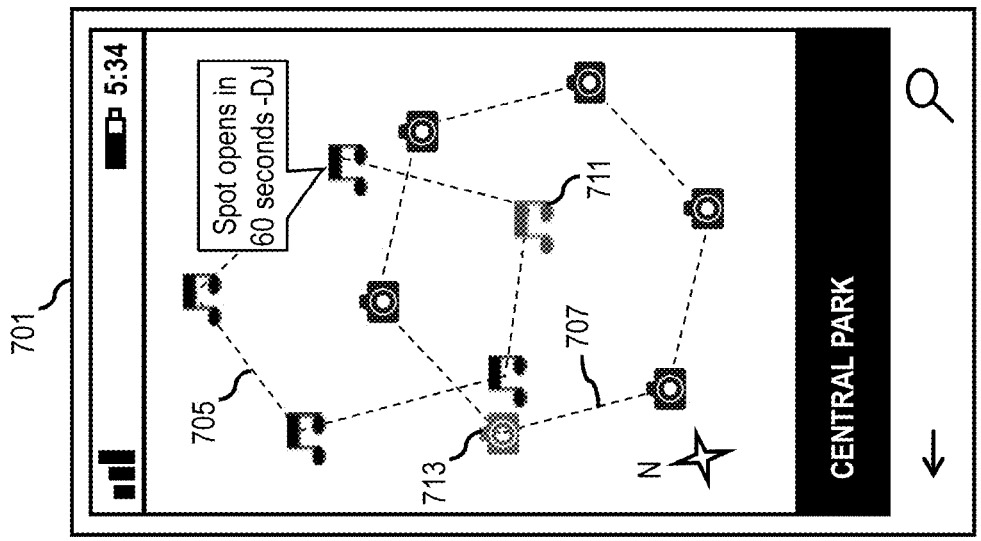
FIG. 7

METHOD AND APPARATUS FOR LEVERAGING OVERLAPPING GROUP AREAS

BACKGROUND

Service providers and device manufacturers (e.g., wireless, cellular, etc.) are continually challenged to deliver value and convenience to consumers by, for example, providing compelling network services. One area of interest has been the development of services that leverage the increasingly popularity of users virtually interacting with one another using mobile devices (e.g., mobile phones and/or tablets) as evidenced by the increasing popularity of social networking services. In addition to interacting within virtual groups, users are also increasingly using devices in physically collocated groups. For example, in a park or on a university campus, there may be two or more groups of users forming different groups (e.g., one group may be viewing photos and another group may be playing a multiplayer videogame). However, in many instances, there is no interaction between the one or more groups despite their close proximity to one another. Accordingly, service providers and device manufacturers face significant technical challenges in providing a service that facilitates interaction among the groups.

SOME EXAMPLE EMBODIMENTS

Therefore, there is a need for an approach for determining a new group of users based on the overlapping area of two or more existing groups and providing services and/or content to the users of the new group based on the services and content of the two or more existing groups.

According to one embodiment, a method comprises determining one or more shapes of one or more groups based, at least in part, on location information associated with one or more member devices of the one or more groups. The method also comprises causing, at least in part, a presentation of one or more representations of the one or more shapes in a location-based user interface. The method further comprises determining one or more applications, one or more content items, or a combination thereof being used at the one or more member devices. The method further comprises causing, at least in part, a presentation of one or more other representations of the one or more applications, the one or more content items, or a combination thereof in the location-based user interface.

According to another embodiment, an apparatus comprises at least one processor, and at least one memory including computer program code, the at least one memory and the computer program code configured to, with the at least one processor, cause, at least in part, the apparatus to determine one or more shapes of one or more groups based, at least in part, on location information associated with one or more member devices of the one or more groups. The apparatus also causes, at least in part, a presentation of one or more representations of the one or more shapes in a location-based user interface. The apparatus is further caused to determine one or more applications, one or more content items, or a combination thereof being used at the one or more member devices. The apparatus further causes, at least in part, a presentation of one or more other representations of the one or more applications, the one or more content items, or a combination thereof in the location-based user interface.

According to another embodiment, a computer-readable storage medium carries one or more sequences of one or more instructions which, when executed by one or more processors, cause, at least in part, an apparatus to determine one or more shapes of one or more groups based, at least in part, on location information associated with one or more member devices of the one or more groups. The apparatus also causes, at least in part, a presentation of one or more representations of the one or more shapes in a location-based user interface. The apparatus is further caused to determine one or more applications, one or more content items, or a combination thereof being used at the one or more member devices. The apparatus further causes, at least in part, a presentation of one or more other representations of the one or more applications, the one or more content items, or a combination thereof in the location-based user interface.

According to another embodiment, an apparatus comprises means for determining one or more shapes of one or more groups based, at least in part, on location information associated with one or more member devices of the one or more groups. The apparatus also comprises means for causing, at least in part, a presentation of one or more representations of the one or more shapes in a location-based user interface. The apparatus further comprises means for determining one or more applications, one or more content items, or a combination thereof being used at the one or more member devices. The apparatus further comprises means for causing, at least in part, a presentation of one or more other representations of the one or more applications, the one or more content items, or a combination thereof in the location-based user interface.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a diagram of user interfaces utilized in the processes of FIGS. 3-5, according to various embodiments;

DESCRIPTION OF SOME EMBODIMENTS

Examples of a method, apparatus, and computer program for determining a new group of users based on the overlapping area of two or more existing groups and providing services and/or content to the users of the new group based on the services and content of the two or more existing groups are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
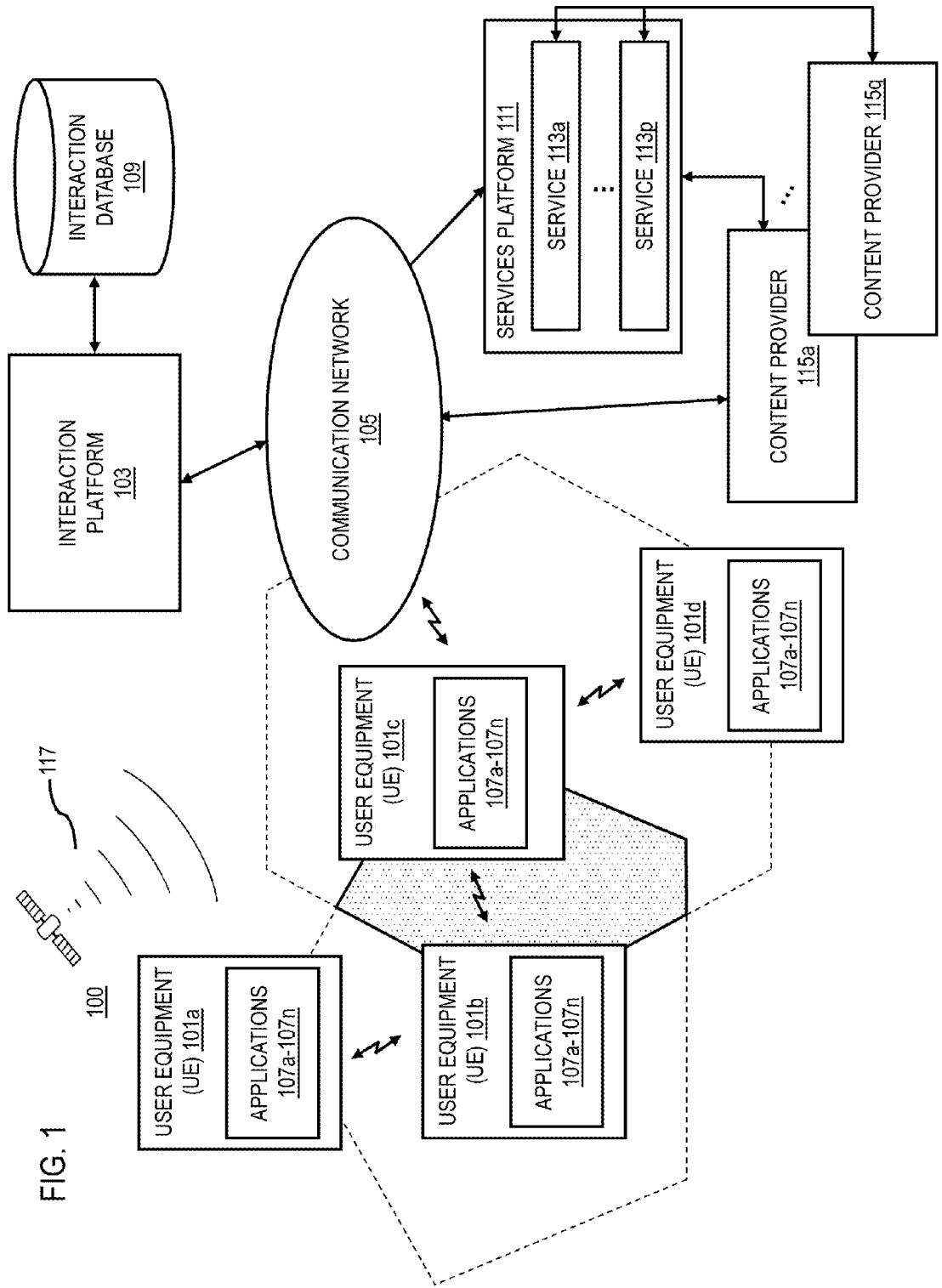
FIG. 1 is a diagram of a system capable of determining a new group of users based on the overlapping area of two or more existing groups and providing services and/or content to the users of the new group based on the services and content of the two or more existing groups, according to one embodiment.

FIG. 1 is a diagram of a system capable of determining a new group of users based on the overlapping area of two or more existing groups and providing services and/or content to the users of the new group based on the services and content of the two or more existing groups, according to one embodiment. As previously discussed, one area of interest among service providers and device manufacturers has been the development of services that leverage the increasing popularity of users virtually interacting with one another using mobile devices (e.g., posting and/or sharing comments, pictures, videos, etc.) as evidenced by the increasing popularity of social networking services. In addition to interacting within virtual groups, users are increasingly using devices in physically collocated groups. By way of example, in a park or in on a university campus, there may be two or more groups of users forming different groups (e.g., one group may be sharing photos and another group may be playing a multiplayer videogame). However, in many instances, there is no interaction between the groups despite their close proximity to one another.

To address this problem, a system 100 of FIG. 1 introduces the capability to determine a new group of users based on the overlapping area of two or more existing groups and to provide services and/or content to the users of the new group based on the services and content of the two or more existing groups. As shown in FIG. 1, the system 100 comprises one or more user equipment (UE) 101a-101m (e.g., mobile phones and/or tablets) (also collectively referred to as UEs 101) having connectivity to an interaction platform 103 via a communication network 105. In one embodiment, the system 100 has been simplified to include four UE 101s (e.g., 101a-101d), however, it is contemplated that any number of UEs 101 could be part of the two or more existing groups and/or the new group of users (e.g., UEs 101b and 101c). The UEs 101 also include or have access to one or more applications 107a-107n (also collectively referred to as applications 107). By way of example, the applications 107 include one or more media applications (e.g., applications for sharing music, photos, videos, etc.), one or more gaming applications, a mapping and/or navigation application, an augmented and/or mixed reality application, one or more social networking applications, an Internet browser, etc.

In one embodiment, the interaction platform 103 may include or be associated with at least one interaction database 109, which may exist in whole or in part within the interaction platform 103. In one example embodiment, the interaction platform 103 may exist in whole or in part within the UEs 101, or independently. The interaction database 109 may include one or more representations of one or more shapes with vertices (e.g., any simple polygon), one or more representations of one or more applications (e.g., a camera icon for a photo sharing application or an avatar from a gaming application), one or more generic notifications regarding participating in a collaborative application 107 (e.g., "vacant slot here in 30 seconds as sorcerer," "vacant slot here in 60 seconds as knight," etc.), one or more media components for coordinating one or more large-scale media items (e.g., a large-scale image, video, musical arrangement, etc.), a list of predetermined gestures for increasing or decreasing a privacy level of the one or more existing groups, etc.

The UEs 101 are also connected to a services platform 111 via the communication network 105. The services platform 111 includes one or more services 113a-113p (also collectively referred to as services 113). The services 113 may include a wide variety of services such as content provisioning services for one or more of the applications 107. By way of example, the services 113 may include media related services (e.g., audio/video streaming, picture sharing, etc.), gaming services (e.g., online games), mapping and/or navigation services, social networking services, etc. The UEs 101, the services platform 111, and the services 113 also have connectivity to one or more content providers 115a-115q (also collectively referred to as content providers 115). The content providers 115 also may provision a wide variety of content (e.g., maps, games, media, etc.) to the components of the system 100.

In certain embodiments, the applications 107 may utilize location-based technologies (e.g., global positioning systems (GPS), cellular triangulation, Assisted GPS (A-GPS), etc.) to make a request to one or more services 113 for location-based data (e.g., mapping and/or navigation information) based on a position relative to a UE 101. For example, a UE 101 may include a GPS receiver to obtain geographic coordinates from the satellites 117 to determine its current location. In one embodiment, the interaction platform 103 can then use this information to determine one or more shapes of the one or more groups associated with the UEs 101.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the system 100 determines one or more shapes of one or more groups (e.g., users sitting in a park) based, at least in part, on location information associated with one or more member devices of the one or more groups. More specifically, the one or more groups may include, at least in part, one or more physically collocated groups (e.g., users sitting in a park, users kicking a ball on a university campus, etc.), one or more virtual groups (e.g., members of a fan club, users on different floors of an office building, etc.), one or more groups of groups (e.g., respective groups of team fans of a super group "soccer fans"), or a combination thereof (e.g., a mixed group of physically and virtually present users). For example, as previously discussed, in the park example use case, there may be two or more groups of users forming different groups within the park (e.g., one group viewing photos and the other group playing a multiplayer videogame). Further, in one embodiment, the system 100 determines the one or more shapes so that the one or more respective locations of the one or more member devices represent one or more vertices of the one or more shapes (e.g., any simple polygon). By way of example, if the system 100 determines that there are three member devices in a group (e.g., UE 101a-UE 101c), then the system 100 can determine that each member's device represents a vertex of a triangle. Likewise, if the system 100 determines that there are four member devices in a group (e.g., UE 101a-101d), then the system 100 can determine that each member device represents a vertex of a square and so forth.

In one or more embodiments, the system 100 causes, at least in part, a presentation of one or more representations of the one or more shapes in a location-based user interface. For example, the system 100 can cause a presentation of the one or more shapes and/or locations of the currently active one or more groups in a two-dimensional map view or a three-dimensional augmented and/or mixed reality view on a UE 101 (e.g., a mobile phone). An illustrative example of the two different views is depicted in FIG. 7.

In one embodiment, the system 100 determines one or more applications, one or more content items, or a combination thereof being used at the one or more member devices. For example, the system 100 may determine that an application 107 is being used based, at least in part, on the application 107 contacting a service 113 or a content provider 115, for example, via the communication network 105 to request additional information and/or data (e.g., location-based data). As previously discussed, the one or more applications may include one or more media sharing applications (e.g., applications for sharing photos, streaming videos, etc.), one or more gaming applications (e.g., memory games, multiplayer videogames, etc.), etc., and the one or more content items may include, at least in part, photos, music, videos, etc. In certain embodiments, the system 100 then causes, at least in part, a presentation of one or more representations of the one or more applications, the one or more content items, or a combination thereof in the location-based user interface. For example, the system 100 may present the one or more applications as one or more simplified glyphs (e.g., a camera for a photo sharing application, a music note for a music sharing application, etc.).

In one or more embodiments, if the system 100 determines that the one or more applications, the one or more content items, or a combination thereof are collaborative (e.g., a multiplayer videogame), then the system 100 can cause, at least in part, a presentation of information for participating in a collaborative use of the one or more applications, the one or more content items, or a combination thereof. By way of example, the information may include a time, a location, a particular role, etc. associated with an upcoming vacant slot at one or more groups. In particular, the system 100 can cause, at least in part, the presentation of at least one notification in the location-based user interface such as "vacant slot here in 30 seconds as sorcerer." Moreover, the system 100 may determine that the one or more applications, for example, are collaborative based, at least in part, on the nature of the application (e.g., a multiplayer gaming application), the number of users simultaneously using the application, or a combination thereof.

In certain embodiments, the system 100 causes, at least in part, a presentation of one or more large-scale media items based, at least in part, on at least a coordination of the one or more member devices. By way of example, if the system 100 determines that the one or more member devices are at an event (e.g., a sporting event), then the system 100 can cause, at least in part, each of the member devices to display at least one portion of a larger image (e.g., an American flag) indicating that the one or more member devices are all part of one or more groups. For example, the system 100 can associate one group of member devices with the stars of the flag and can associate a second group with the stripes of the flag. In another example use case, if the system 100 determines that the one or more member devices are located in an auditorium, for example, the system 100 can cause, at least in part, each of the member devices to produce a sound as part of a musical arrangement. In one embodiment, it is contemplated that the system 100 can determine the location of the one or more member devices based, at least in part, on the location information associated with the one or more member devices (e.g., GPS coordinates), one or more social networking services (e.g., a user "check in"), or a combination thereof.

In one embodiment, the system 100 determines that there is an overlapping area between at least a first one of the one or more groups (i.e., a first group) and at least a second one of the one or more groups (i.e., a second group). In particular, the system 100 can determine the overlapping area based, at least in part, on the location information associated with the one or more member devices (e.g., one or more GPS coordinates). For example, in the park example use case, the system 100 can determine an overlap between the first group sharing photos and the second group playing a multiplayer videogame (e.g., online poker). The system 100 in certain embodiments then determines that a new device has entered the overlapping area (e.g., based on the GPS coordinates of the new device relative to the GPS coordinates of the existing member devices). In one or more embodiments, the system 100 determines to make available to the new device the one or more applications, the one or more content items, or a combination thereof associated with the first and second groups (e.g., one or more shared photos, at least one access to the multiplayer videogame, etc.).

In one embodiment, the system 100 determines at least a third one of the one or more groups (i.e., a third group) based, at least in part, on the overlapping area. As previously discussed, while there may not initially be any interaction between the one or more groups, the system 100 can facilitate interaction and inclusion among the members of the one or more groups by joining one or more members within the overlapping area into a third group (i.e., a new group). In certain embodiments, depending on the respective applications and/or content items, the system 100 can determine to make available to the third group one or more combined applications, one or more combined content items, or a combination thereof based, at least in part, on the one or more applications, the one or more content items, or a combination thereof associated with the first and second groups. By way of example, if the system 100 determines that the first group "A" is sharing vacation photos among the group and the second group "B" is playing a memory card game, then the system 100 can make available to the member devices of the third group "C" a version of the memory game incorporating the shared photos. In another example use case, if the system 100 determines that group "A" is sharing photos among the group and group "B" is sharing music, then the system 100 can make available to the member devices of the third group "C" videos incorporating the photos and the music. In a further example use case, if the system 100 determines that the users of group "A" are playing video game "X" and the users of group "B" are playing video game "Y", then the system 100 can make available to the member devices of the third group "C" a version of videogame "X" incorporating characters and/or features of videogame "Y", and/or vice-versa.

In one or more embodiments, the system 100 can process and/or facilitate a processing of the overlapping area to determine a degree of overlap. More specifically, the system 100 processes the location information associated with the one or more devices to determine the degree of overlap. In one embodiment, the system 100 can determine the degree of overlap based, at least in part, on the number of vertices within the overlapping area (e.g., three vertices may suggest a high degree of overlap). Consequently, in one embodiment, the system 100 causes, at least in part, at least one modification of the availability of the one or more applications, the one or more content items, or a combination thereof to the new device based, at least in part, on the degree of overlap. By way of example, where the system 100 determines a high degree of overlap, the system 100 may make available to a new device (e.g., a device associated with a user entering the overlapping area) a greater number of photos, songs, videos, etc. associated with the member devices of the first and the second groups. In one embodiment, the system 100 can also cause, at least in part, at least one modification of the availability of the one or more combined applications, the one or more combined content items, or a combination thereof to the new device based, at least in part, on the degree of overlap.

Rather than absorbing any new device that enters the overlapping area, in one or more embodiments, the system 100 can first determine at least one plurality of one or more gestures associated with the one or more member devices of the first and second groups based, at least in part, on one or more sensors associated with the one or more member devices, user input, or a combination thereof. For example, a member of the first or second group noticing the presence of a new device whether visually or by one or more notifications from the system 100 may tilt his or her mobile device away from his or her body to subtlety suggest that the system 100 should decrease the level of privacy when one or more new users enter the overlapping area (i.e., allow a user to join). In contrast, the member may tilt his or her mobile device towards his or her body to suggest that the system 100 should increase the level of privacy (i.e., prevent a user from joining). In particular, the system 100 determines at least one plurality of the one or more gestures so that the system 100 detects the one or more gestures as a collective inclusion/exclusion gesture rather than as a random gesture done by a single member. As a result, in one or more embodiments, the system 100 determines to make available or unavailable to the new device the one or more applications, the one or more content items, or a combination thereof based, at least in part, on the plurality of the one or more gestures. By way of example, the system 100 can cause, at least in part, a transmission of at least one invitation to the new device to join the one or more groups (e.g., the third group) and if the user of the new device accepts, then the system 100 can enable the user to download the respective one or more applications, respective one or more content items, or a combination thereof. Further, in certain embodiments, the system 100 can cause, at least in part, the one or more radios (e.g., Bluetooth® or wireless local area networks (WLAN)) associated with the one or more member devices to be hidden from the new device based, at least in part, on the determination to make the one or more applications, the one or more content items, or a combination thereof unavailable to the new device. Consequently, the user of the new device is hindered by the system 100 from easily detecting the one or more groups, which can help to protect the privacy of the one or more members of the one or more groups. In one embodiment, it is contemplated that the same logic can also apply to system 100 making available the one or more combined applications, the one or more combined content items, or a combination thereof to the new device.

By way of example, the UE 101s, the interaction platform 103, the applications 107, the interaction database 109, the services platform 111, the services 113, the content providers 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
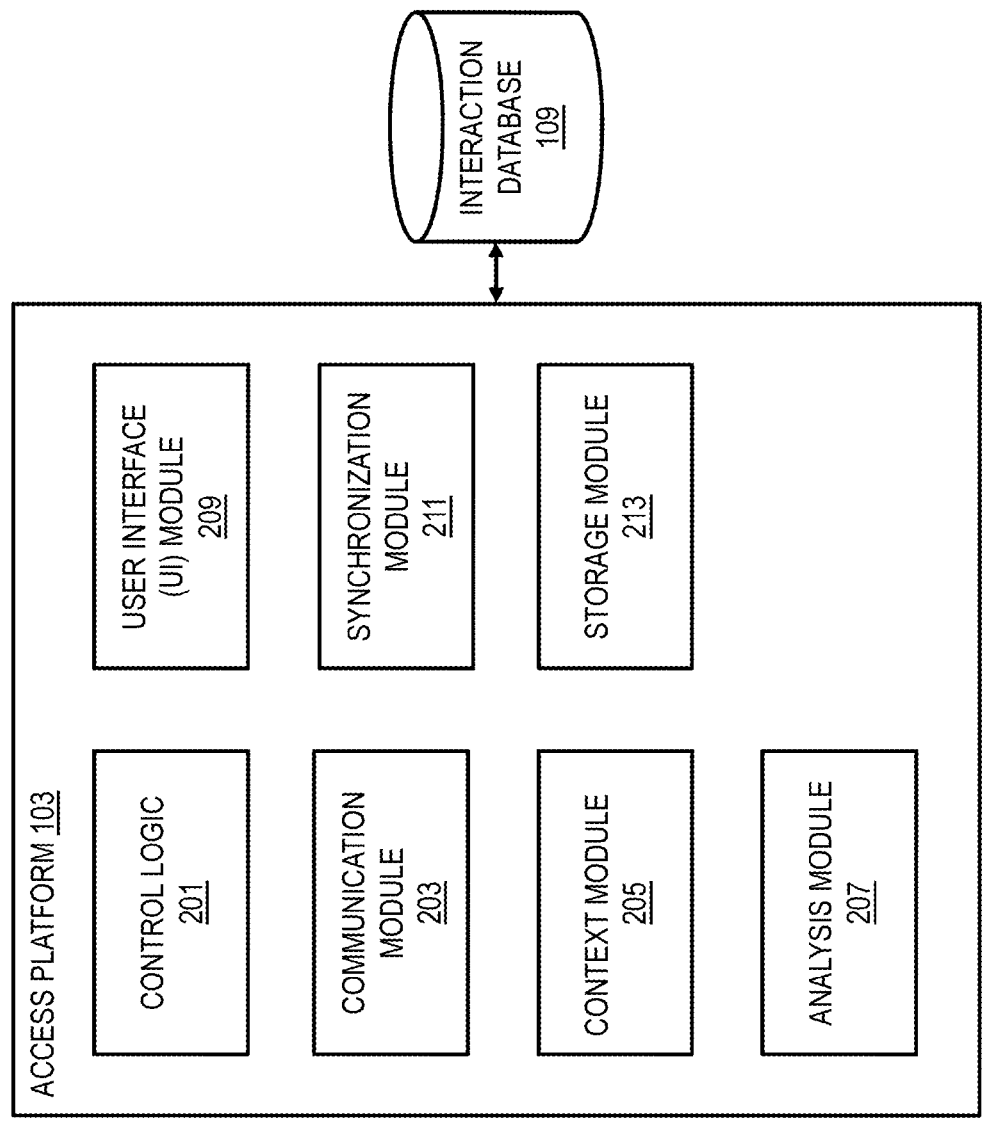
FIG. 2 is a diagram of the components of an interaction platform, according to one embodiment.

FIG. 2 is a diagram of the components of an interaction platform 103, according to one embodiment. By way of example, the interaction platform 103 includes one or more components for determining a new group of users based on the overlapping area of two or more existing groups and providing services and/or content to the users of the new group based on the services and content of the two or more existing groups. It is contemplated that the functions of these components may be combined in one or more components or performed by other components of equivalent functionality. In this embodiment, the interaction platform 103 includes a control logic 201, a communication module 203, a context module 205, an analysis module 207, a user interface (UI) module 209, a synchronization module 211, and a storage module 213.

In one embodiment, the control logic 201 oversees tasks, including tasks performed by the communication module 203, the context module 205, the analysis module 207, the UI module 209, the synchronization module 211, and the storage module 213. For example, although the other modules may perform the actual task, the control logic 201 may determine when and how those tasks are performed or otherwise direct the other modules to perform the task. In one embodiment, the control logic 201 also may be used to determine to make available to the new device (e.g., a mobile phone or a tablet) the one or more applications (e.g., a photo sharing application), the one or more content items (e.g., shared photos), or a combination thereof associated with the at least first one of the one or more groups and the at least second one of the one or more groups. The control logic 201 may also be used to determine to make available to the at least a third one of the one or more groups one or more combined applications, one or more combined content items, or a combination thereof based, at least in part, on the one or more applications, the one or more content items, or a combination thereof. Further, the control logic 201 also may be used to cause, at least in part, at least one modification of the availability of the one or more applications, the one or more content items, or a combination thereof to the new device based, at least in part, on the degree of overlap.

The communication module 203 in certain embodiments is used for communication between the UEs 101, the interaction platform 103, the applications 107, the interaction database 109, the services platform 111, the services 113, the content providers 115, and the satellites 117. In one embodiment, the communication module 203 also may be used to cause, at least in part, one or more radios associated with the one or more member devices (e.g., Bluetooth® or WLAN) to be hidden from the new device based, at least in part, on the determination by the system 100 to make the one or more applications, the one or more content items, or a combination thereof unavailable to the new device.

In one embodiment, the context module 205 is used to determine one or more shapes of one or more groups based, at least in part, on location information associated with one or member devices of the one or more groups. In particular, the context module 205 may determine the location information based, at least in part, on one or more location-based technologies (e.g., GPS, cellular triangulation, A-GPS, etc.), one or more location-based social networking services (e.g., a user "check in"), or a combination thereof. The context module 205 may also be used to determine the one or more groups based, at least in part, on one or more physically collocated groups (e.g., users sitting in a park), one or more virtual groups (e.g., members of a fan club), one or more groups of groups (e.g., super groups), or a combination thereof. As previously discussed, the context module 205 may determine the one or more groups based, at least in part, on one or more location-based technologies, one or more location-based social networking services, user input, or a combination thereof. The context module 205 also may be used to determine that a new device has entered the overlapping area (e.g., based on GPS coordinates of the new device relative to the GPS coordinates of the one or more existing member devices). Further, the context module 205 may also be used to determine at least one plurality of one or more gestures associated with the one or more members devices based, at least in part, on one or more sensors associated with the one or more member devices, user input, or a combination thereof. For example, the context module 205 may determine that a user is subtlety tilting towards or away from his or her body his or her member device (e.g., based on a tilt or angle sensor).

The analysis module 207 in certain embodiments is used to determine one or more shapes (e.g., any simple polygon) so that one or more respective locations of the one or more member devices represent one or more vertices of the one or more shapes. The analysis module 207, in connection with the communication module 203, may also be used to determine one or more applications (e.g., media sharing applications, multiplayer gaming applications, etc.), one or more content items (e.g., photos, music, videos, etc.), or a combination thereof being used at the one or more member devices. For example, the analysis module 207 can determine that an application is being used on a member's device (e.g., a mobile phone) based, at least in part, on the application contacting a service 113 or a content provider 115, for example, via the communication network 105 to request additional information and/or data (e.g., location-based data). The analysis module 207 also may be used to determine whether the one or more applications, the one or more content items, or a combination thereof are collaborative in nature (e.g., based on the particular application or by determining the number of simultaneous users and/or participants). The analysis module 207, in connection with the context module 205, may also be used to determine that there is an overlapping area between at least a first one of the one or more groups and at least a second one of the one or more groups (e.g., based on GPS coordinates). The analysis module 207 also may be used to determine at least a third one of the one or more groups based, at least in part, on the overlapping area. In one embodiment, the analysis module 207 may also be used to process and/or facilitate a processing of the overlapping area to determine a degree of overlap. For example, the analysis module 207 may determine the degree of overlap based, at least in part, on the number of vertices within the overlapping area (e.g., three vertices may suggest a high degree of overlap). Further, the analysis module 207 may also be used to determine to make available or unavailable to the new device the one or more applications, the one or more content items, or a combination thereof based, at least in part, on a plurality of the one or more gestures associated with the one or more member devices.

In one embodiment, the UI module 209 causes, at least in part, a presentation of one or more representations of the one or more shapes in a location-based user interface. For example, the UI module 209 may present the one or more shapes on a two-dimensional map, within an augmented and/or mixed reality display, or a combination thereof. The UI module 209 also may be used to cause, at least in part, a presentation of one or more other representations of the one or more applications, the one or more content items, or a combination thereof in the location-based user interface. By way of example, the UI module 209 may present the one or more applications as one or more simplified glyphs (e.g., a camera for a photo sharing application). The UI module 209, in connection with the analysis module 207, can also cause, at least in part, a presentation of information for participating in a collaborative use of the one or more applications, the one or more content items, or a combination thereof in the location-based user interface (e.g., "vacant spot here in 30 seconds as sorcerer").

In one or more embodiments, the synchronization module 211 is used to cause, at least in part, a presentation of one or more large-scale media items (e.g., an image, a music arrangement, etc.) based, at least in part, on at least one coordination of the one or more member devices. In one embodiment, the storage module 213 is used to manage the storage of the one or more representations of one or more shapes with vertices (e.g., any simple polygon), one or more representations of one or more applications (e.g., a camera icon for a photo sharing application), one or more generic notifications regarding participating in a collaborative application (e.g., "vacant slot here in 30 seconds as sorcerer"), one or more media components for coordinating one or more large-scale media items, a list of predetermined gestures for increasing or decreasing a privacy level of the one or more existing groups, or combination thereof stored in the interaction database 109.

Figure 3:
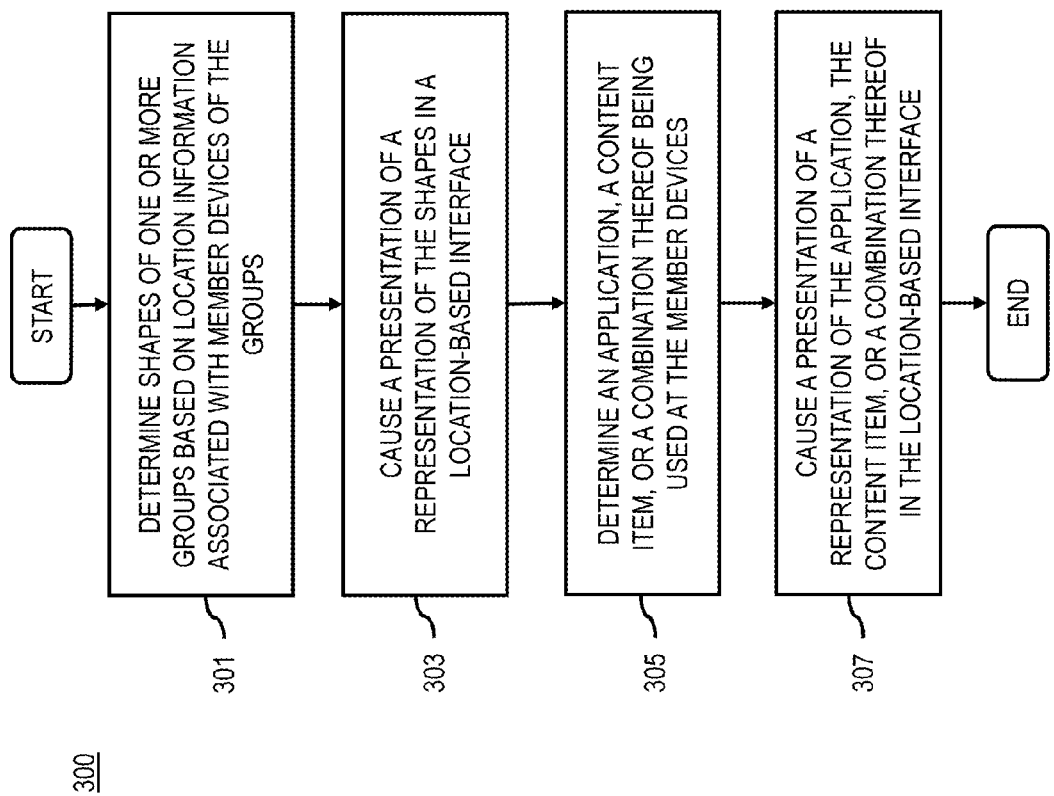
FIGS. 3-5 are flowcharts of processes for determining a new group of users based on the overlapping area of two or more existing groups and providing services and/or content to the users of the new group based on the services and content of the two or more existing groups, according to one embodiment.
Figure 4:
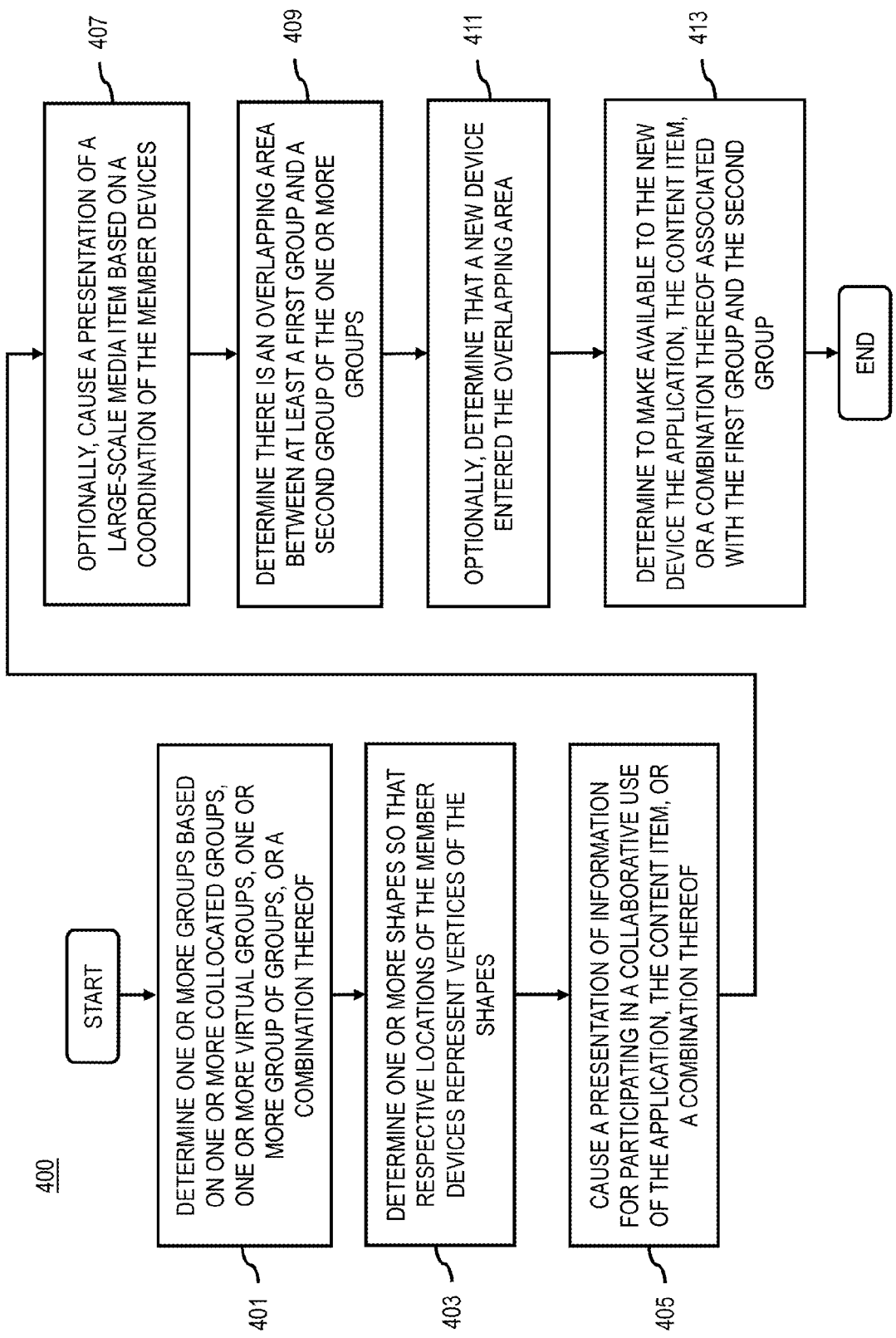
Figure 5:
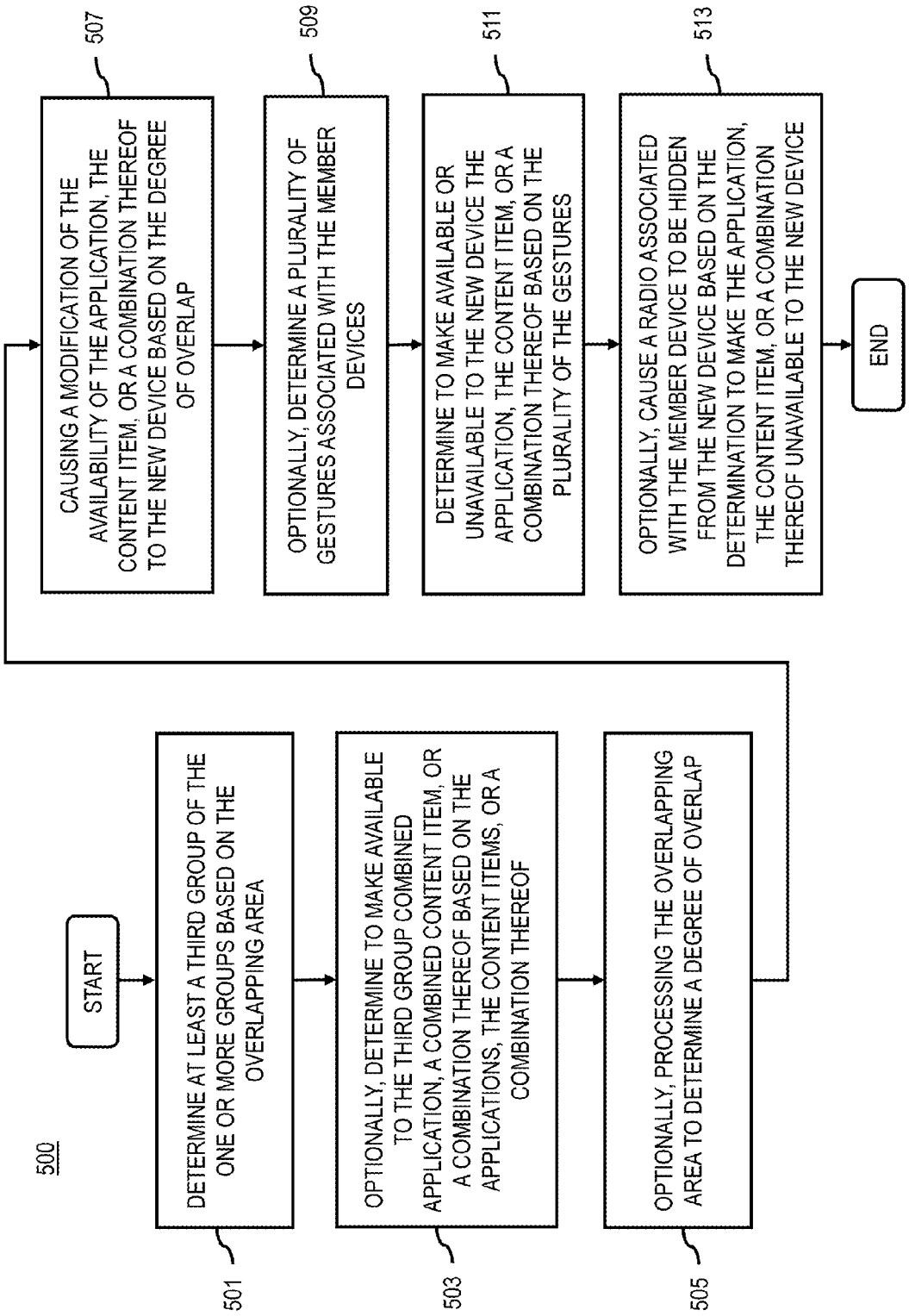
Figure 9:
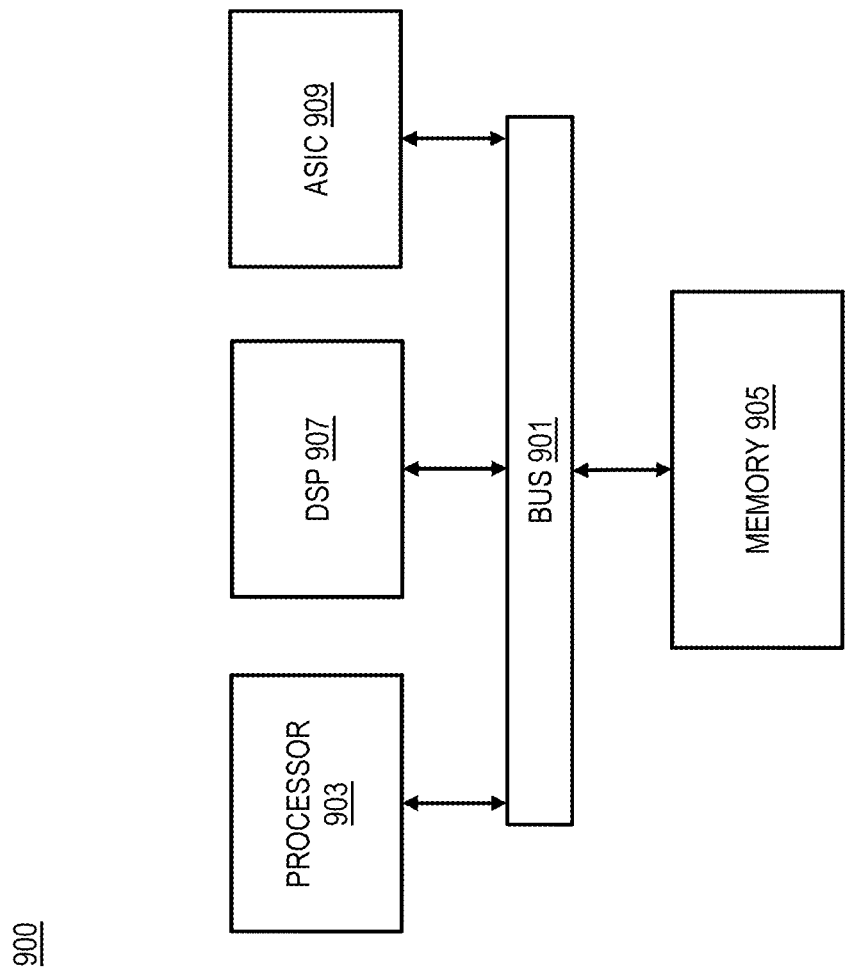
FIG. 9 is a diagram of a chip set that can be used to implement an embodiment of the invention.

FIGS. 3-5 are flowcharts of processes for determining a new group of users based on the overlapping area of two or more existing groups and providing services and/or content to the users of the new group based on the services and content of the two or more existing groups, according to one embodiment. In one embodiment, the interaction platform 103 performs the process 300 and is implemented in, for instance, a chip set including a processor and a memory as shown in FIG. 9. In step 301, the interaction platform 103 determines one or more shapes of one or more groups based, at least in part, on location information associated with one or more member devices of the one or more groups. In particular, the one or more groups may include, at least in part, one or more physically collocated groups (e.g., users sitting in a park); one or more virtual groups (e.g., members of a fan club); one or more groups of groups (e.g., respective team fans of a super group "soccer fans"), or a combination thereof (e.g., a mixed group of physically and virtually present users). By way of example, in the park example use case, there may be two or more groups of users forming different groups within the park (e.g., one group sharing photos and the other group playing a multiplayer videogame). Moreover, the interaction platform 103 may determine the location information associated with the one or more member devices (e.g., mobile phones and/or tablets) based, at least in part, on one or more location-based technologies (e.g., GPS, cellular triangulation, A-GPS, etc.), one or more location-based social networking services (e.g., a user "check in"), or a combination thereof.

In step 303, the interaction platform 103 causes, at least in part, a presentation of one or more representations of the one or more shapes in a location-based user interface. By way of example, the one or more representations may include a two-dimensional map view, a three-dimensional augmented and/or mixed reality view, or a combination thereof.

In step 305, the interaction platform 103 determines one or more applications, one or more content items, or a combination thereof being used at the one or more member devices. For example, the interaction platform 103 may determine that an application 107 running on a member's device is contacting a service 113 or a content provider 115, for example, via the communication network 105 to request additional information and/or data (e.g., location-based data). More specifically, the one or more applications may include one or more media sharing applications (e.g., applications for sharing photos, streaming videos, etc.), one or more gaming applications (e.g., memory games, multiplayer videogames, etc.), etc., and the one or more content items may include, at least in part, photos, music, videos, etc. Then in step 307, the interaction platform 103 causes, at least in part, a presentation of one or more other representations of the one or more applications, the one or more content items, or a combination thereof in the location-based user interface. In one example use case, the one or more other representations may include one or more simplified glyphs (e.g., a camera for a photo sharing application, a music note for a music sharing application, etc.). An illustrative example of the one or more other representations is depicted in interface 701 of FIG. 7.

FIG. 4 depicts a process 400 of determining one or more shapes, one or more groups, or a combination thereof associated with one or more member devices and causing, at least in part, a presentation of information and/or one or more large-scale media items based, at least in part, on the one or more member devices. In one embodiment, the interaction platform 103 performs the process 400 and is implemented in, for instance, a chip set including a processor and a memory as shown in FIG. 9. In step 401, the interaction platform 103 determines the one or more groups based, at least in part, on one or more physically collocated groups, one or more virtual groups, one or more groups of groups, or a combination thereof. By way of example, the one or more physically collocated groups may include one or more users located in a park or on a college campus, for example. By way of further example, the one or more virtual groups may include one or more members of a fan club, one or more users among different floors of an office building, etc. Further, it is contemplated that the one or more groups may also include a mix of both physically and virtually present users so that the one or more groups within an overlapping area may also be mixed in composition.

In step 403, the interaction platform 103 determines the one or more shapes so that one or more respective locations of the one or more member devices represent one or more vertices of the one or more shapes. In particular, the one or more shapes include any simple polygon. By way of example, if the interaction platform 103 determines that there are three member devices in a group, then the interaction platform 103 can determine that each member's device represents a vertex of a triangle. Similarly, if the interaction platform 103 determines that there are four member devices in a group, then the interaction platform 103 can determine that each member device represents a vertex of a square, and so forth.

In step 405, wherein the one or more applications, the one or more content items, or a combination thereof are collaborative, the interaction platform 103 causes, at least in part, a presentation of information for participating in a collaborative use of the one or more applications, the one or more content items, or a combination thereof. In one example use case, the information may include a time, a location, a role, etc. associated with an upcoming vacant slot at one of the one or more groups. In particular, the interaction platform 103 can cause, at least in part, a presentation of a notification in a location-based user interface such as "vacant slot here in 30 seconds as sorcerer" or "vacant slot here in 60 seconds as knight," for example. Further, the interaction platform 103 may determine the one or more applications, for example, are collaborative based, at least in part, on the nature of the application (e.g., a multiplayer gaming application), the number of users simultaneously using the application, or a combination thereof.

In step 407, the interaction platform 103 optionally causes, at least in part, a presentation of one or more large-scale media items based, at least in part, on at least one coordination of the one or more member devices. By way of example, if the interaction platform 103 determines that the one or more member devices (e.g., mobile phones and/or tablets) are at an event (e.g., a sporting event), then the interaction platform 103 can cause, at least in part, each of the member devices to display at least one portion of a larger image (e.g., an American flag) indicating that the one or more member devices are all part of one or more groups. For example, the interaction platform 103 can associate at least one first group of member devices with the stars of the flag and can associate at least one second group of member devices with the stripes of the flag.

In step 409, the interaction platform 103 determines that there is an overlapping area between at least a first one of the one or more groups and at least a second one of the one or more groups. In particular, the interaction platform 103 can determine the overlapping area based, at least in part, on the location information associated with the one or more member devices (e.g., one or more GPS coordinates). For example, in the park example use case, the interaction platform 103 may determine an overlap between the first group sharing photos, for example, and the second group playing a multiplayer videogame such as online poker, for example. Then in step 411, the interaction platform 103 optionally determines that a new device has entered the overlapping area. By way of example, the interaction platform 103 may determine that the new device has moved within the one or more shapes of the one or more groups already within the park based, at least in part, on GPS coordinates associated with the devices, for example. Consequently, in step 413, the interaction platform 103 determines to make available to the new device the one or more applications, the one or more content items, or a combination thereof associated with the at least a first one of the one or more groups and the at least a second one of the one or more groups. For example, the interaction platform 103 can make available to the new device one or more photos shared among the first group, at least one access to the multiplayer videogame being played by the second group, or a combination thereof.

FIG. 5 depicts a process 500 of determining at least one third group based on an overlapping area and one or more optional determinations regarding the availability or unavailability of one or more applications, one or more content items, or a combination thereof associated with the first and second groups of the one or more groups. In one embodiment, the interaction platform 103 performs the process 500 and is implemented in, for instance, a chip set including a processor and a memory as shown in FIG. 9. In step 501, the interaction platform 103 determines at least a third one of the one or more groups based, at least in part, on the overlapping area. By way of example, while there may not initially be any interaction between the one or more groups, the interaction platform 103 can facilitate interaction and inclusion among the members of the one or more groups by joining one or more members within the overlapping area into a third group (i.e., a new group). Then in step 503, the interaction platform 103 determines to make available to the at least a third one of the one or more groups one or more combined applications, one or more combined content items, or a combination thereof based, at least in part, on the one or more applications, the one or more content items, or a combination thereof. For example, if the interaction platform 103 determines that the first group "A" is sharing vacation photos among the group and the second group "B" is playing a memory card game, then the interaction platform 103 can make available to the member devices of the third group "C" a version of the memory card game incorporating the shared photos. In another example use case, if the interaction platform 103 determines that the users of group "A" are playing videogame "X" and the users of group "B" are playing videogame "Y", then the interaction platform 103 can make available to the member devices of the third group "C" a version of videogame "X" incorporating characters and/or features from the videogame "Y", and/or vice-versa.

In step 505, the interaction platform 103 optionally processes and/or facilitates a processing of the overlapping area to determine a degree of overlap. More specifically, the interaction platform 103 can process the location information associated with the one or more member devices to determine the degree of overlap. In one example use case, the interaction platform 103 can determine the degree of overlap based, at least in part, on the number of vertices within the overlapping area (e.g., three vertices may suggest a high degree of overlap). As a result, in step 507, the interaction platform 103 causes, at least in part, at least one modification of the availability of the one or more applications, the one or more content items, or a combination thereof to the new device based, at least in part, on the degree of overlap. For example, where the interaction platform 103 determines a high degree of overlap, the interaction platform 103 may make available to a new device (e.g., a device associated with a user that has entered the overlapping area) a greater number of photos, songs, videos, etc. associated with the member devices of the first and second groups. In one embodiment, the interaction platform 103 can also cause, at least in part, at least one modification of the availability of the one or more combined applications, the one or more combined media items, or a combination thereof to the new device based, at least in part, on the degree of overlap.

In step 509, wherein the new device has entered the overlapping area, the interaction platform 103 optionally determines at least one plurality of one or more gestures associated with the one or more member devices based, at least in part, on one or more sensors associated with the one or more member devices, user input, or a combination thereof. By way of example, a user of the first or second group noticing the presence of a new device whether by sight and/or one or more notifications from the interaction platform 103 may tilt his or her mobile device away from his or her body to subtlety suggest that the interaction platform 103 should decrease the level of privacy when one or more new users enter the overlapping area (i.e., allow a user to join). In contrast, the user may tilt his or her mobile device towards his or her body to suggest that the interaction platform 103 should increase the level of privacy (i.e., prevent a user from joining). As previously discussed, the interaction platform 103 determines at least one plurality of the one or more gestures so that the interaction platform 103 detects the one or more gestures as a collective inclusion/exclusion gesture rather than as a random gesture done by a single member. Consequently, in step 511, the interaction platform 103 determines to make available or unavailable to the new device the one or more applications, the one or more content items, or a combination thereof based, at least in part, on the plurality of the one or more gestures. By way of example, the interaction platform 103 can cause, at least in part, a transmission of at least one invitation to the new device to join the one or more groups (e.g., the third group) and if the user of the new device accepts, then the interaction platform 103 can enable the user to download the one or more respective applications, the one or more respective content items, or a combination thereof. As previously discussed, in one embodiment, the interaction platform 103 can also determine to make available or unavailable to the new device one or more combined applications, one or more content media items, or a combination thereof.

In step 513, the interaction platform 103 optionally causes, at least in part, one or more radios associated with the one or more member devices to be hidden from the new device based, at least in part, on the determination to make the one or more applications, the one or more content items, or a combination thereof unavailable to the new device. For example, the interaction platform 103 can hide one or more Bluetooth® or WLAN radios associated with the one or more member devices from the new device. Consequently, the user of the new device is hindered by the interaction platform 103 from easily detecting the presence of the one or more groups, which can help to protect the privacy of the one or more members of the one or more groups.

Figure 6:
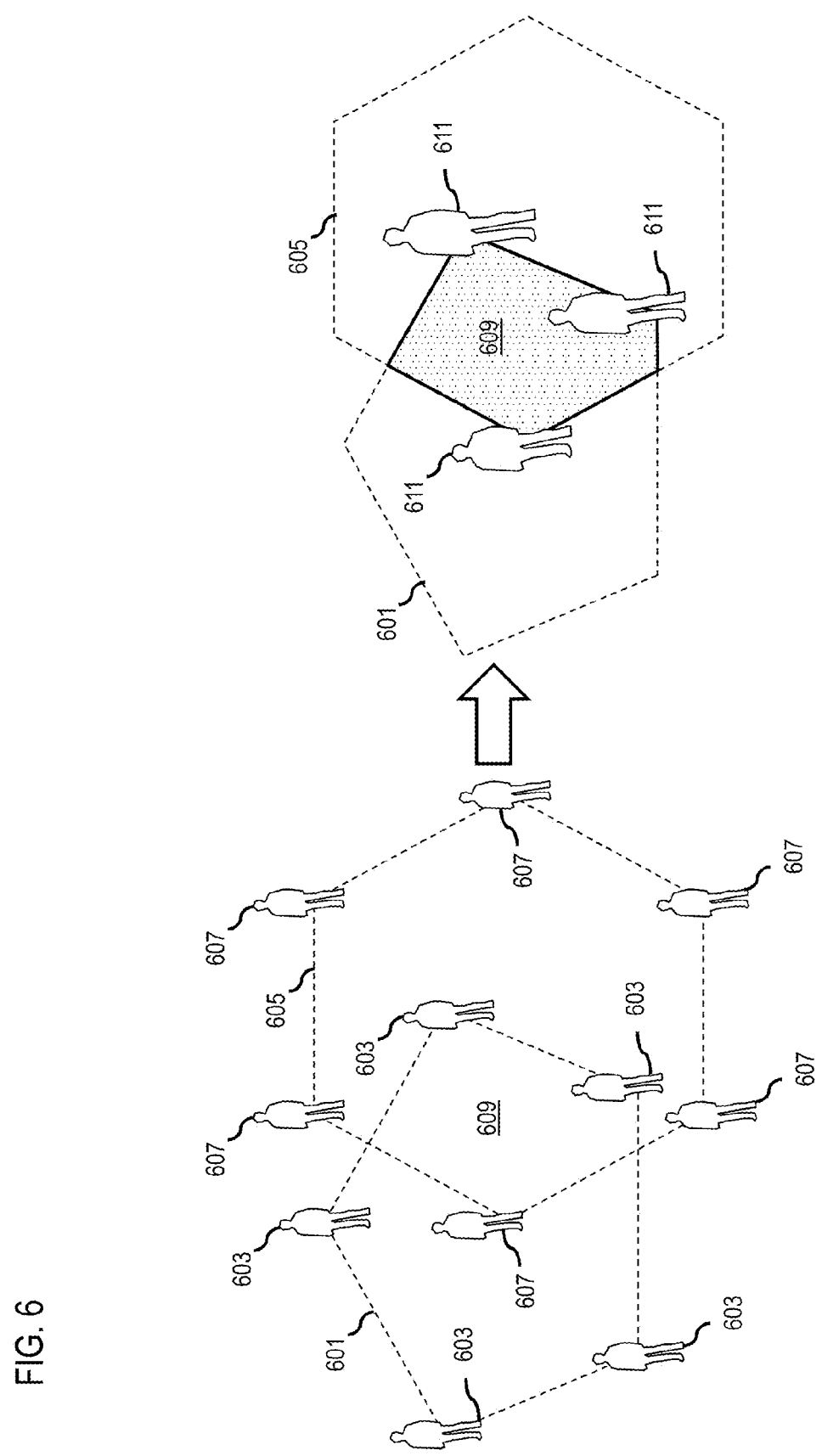
FIG. 6 is a diagram of an example use case depicting the utilization of the processes of FIGS. 3-5, according to various embodiments.

FIG. 6 is a diagram of an example use case depicting the utilization of the processes of FIGS. 3-5, according to various embodiments. As shown, FIG. 6 depicts a first one of the one or more groups 601 (i.e., a first group) including members 603 and at least a second one of the one or more groups 605 (i.e., a second group) including members 607. In particular, to protect the privacy of the members 603 and 607, the system 100 does not present their respective identities. In one embodiment, the system 100 determines one or more shapes of the groups 601 and 605 based, at least in part, on location information associated with one or more member devices (e.g., mobile phones and/or tablets) of the members 603 and 607. As previously discussed, the system 100 determines the one or more shapes so that the one or more respective locations of the one or more member devices represent one or more vertices of the one or more shapes as depicted by the respective locations of the members 603 and 607.

In one embodiment, the system 100 determines one or more applications, one or more content items, or a combination thereof being used at the one or more member devices (e.g., the devices of the members 603 and 607). In particular, the system 100 may determine the one or more applications based, at least in part, on one or more applications contacting a service 113 or a content provider 115, for example, via the communication network 105 to request additional information and/or data (e.g., location-based data). By way of example, the members 603 may be sharing vacation photos using one application and the members 607 may be playing an online memory card game.

In one embodiment, the system 100 determines that there is an overlapping area 609 between at the first group 601 and the second group 605. In particular, the system 100 can determine the overlapping area 609 based, at least in part, on the location information associated with the one or more member devices of the members 603 and 607. In one embodiment, the system 100 determines at least a third one of the one or more groups (i.e., a third group or a new group) based, at least in part, on the overlapping area 609. In this example use case, the overlapping area 609 includes members 611, which were previously members of the groups 601 and 605, respectively.

In certain embodiments, depending on the respective applications and/or content items, the system 100 can determine to make available to the members 611 one or more combined applications, one or more combined content items, or a combination thereof. For example, in this example use case, the system 100 can make available to the members 611 of the overlapping group 609 a memory card game incorporating the memory cards of the first group 601 and the vacation photos of the second group 605.

As previously discussed, in one embodiment, the system 100 can process and/or facilitate a processing of the overlapping area 609 to determine a degree of overlap. More specifically, the system 100 processes the location information associated with the member devices of the members 603 and 607. In one embodiment, the system 100 can determine the degree of overlap based, at least in part, on the number of vertices within the overlapping area 609. In this example use case, the system 100 determines that there are three vertices within the overlapping area 609, which may suggest a high degree of overlap. Consequently, in one embodiment, the system 100 causes, at least in part, at least one modification of the availability of the one or more applications, the one or more content items, or a combination thereof based, at least in part, on the degree of overlap. By way of example, where the system 100 determines a high degree of overlap between the groups 601 and 605, the system may make available to member devices of members 611a greater number of vacation photos and/or provide the memory card game with a greater degree of functionality (e.g., a paid version versus a demo version).

FIG. 7 is a diagram of user interfaces utilized in the processes of FIG. 3-5, according to various embodiments. As shown, the example user interfaces of FIG. 7 include one or more user interface elements and/or functionalities created and/or modified based, at least in part, on information, data, and/or signals resulting from the processes (e.g., processes 300, 400, and 500) described with respect to FIGS. 3-5. More specifically, FIG. 7 illustrates two location-based user interfaces (e.g., 701 and 703).

Similar to the example use case of FIG. 6, in one embodiment, the system 100 first determines one or more shapes of one or more groups (e.g., groups 705 and 707 of interface 701 and group 709 of interface 703) based, at least in part, on location information associated with the one or more member devices of the one or more groups. More specifically, the one or more groups may include at least in part, one or more physically collocated groups (e.g., groups 705, 707, and 709), one or more virtual groups, one or more groups of groups, or a combination thereof. In this example use case, while the majority of the members of the groups 705 and 707 are sitting in Central Park in New York City, the members 711 and 713 of the groups 705 and 707, respectively, are virtually sharing the one or more applications, one or more content items, or a combination thereof.

In one embodiment, the system 100 determines one or more shapes of one or more groups (e.g. the groups 705 and 707 of the interface 701 and the group 709 of the interface 703) based, at least in part, on location associated with one or more member devices of the one or more groups. In particular, in one embodiment, the system 100 determines the one or more shapes so that the one or more respective locations of the one or more member devices of the groups 705, 705, and 709 represent one or more vertices of the one or more shapes. In one or more embodiments, the system 100 then causes, at least in part, a presentation of one or more representations of the one or more shapes in a location-based user interface (e.g., interfaces 701 and 703) as depicted by the dashed lines of the shapes of the groups 705, 707, and 709. By way of example, the system 100 can then cause, at least in part, a presentation of the one or more shapes and/or locations of the currently active one or more groups in a two-dimensional map view (e.g., interface 701), a three-dimensional augmented and/or mixed reality view (e.g., interface 703), or a combination thereof.

In one or more embodiments, the system 100 next determines one or more applications, one or more content items, or a combination thereof being used at the one or more member devices of the members of the groups 705, 707, and 709. As previously discussed, the one or more application may include one or more media sharing applications, one or more gaming applications, etc., and the one or more content items may include, at least in part, photos, music, videos, etc. In this example use case, the system 100 determines that the members of the group 705 are using at least one music sharing application, the members of the group 707 are using at least one photo sharing application, and the members of the group 709 are using a multiplayer gaming application. In one embodiment, the system 100 then causes, at least in part, a presentation of the one or more representations of the one or more applications, the one or more content items, or a combination thereof in the location-based user interfaces 701 and 703. For example, the system 100 represents the music sharing application of the group 705 as a music symbol, the photo sharing application of the group 707 as a camera symbol, and the multiplayer gaming application of the group 709 as respective avatars associated with each member of the group 709. More specifically, because the members 711 and 713 are virtual members of the groups 705 and 707, respectively, the system 100 represents the respective music and camera symbols with less intensity than the symbols associated with the physically present members of the groups 705 and 707.

In one or more embodiments, if the system 100 determines that the one or more applications (e.g., the music sharing application of the group 705, the photo sharing application of the group 707, and the multiplayer gaming application of the group 709), the one or more content items, or a combination thereof are collaborative, then the system 100 can cause, at least in part, a presentation of information for participating in a collaborative use of the one or more applications. By way of example, the information may include a time, a location, a particular role, etc. associated with an upcoming vacant slot at the one or more groups (e.g., the groups 705, 707, and 709). More specifically, the system 100 can cause, at least in part, the presentation of at least one notification in the location-based user interface 701 "Spot opens in 60 second—DJ" or "Vacant sport in 30 second—Sorcerer" in the location-based user interface 703.

The processes described herein for determining a new group of users based on the overlapping area of two or more existing groups and providing services and/or content to the users of the new group based on the services and content of the two or more existing groups may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
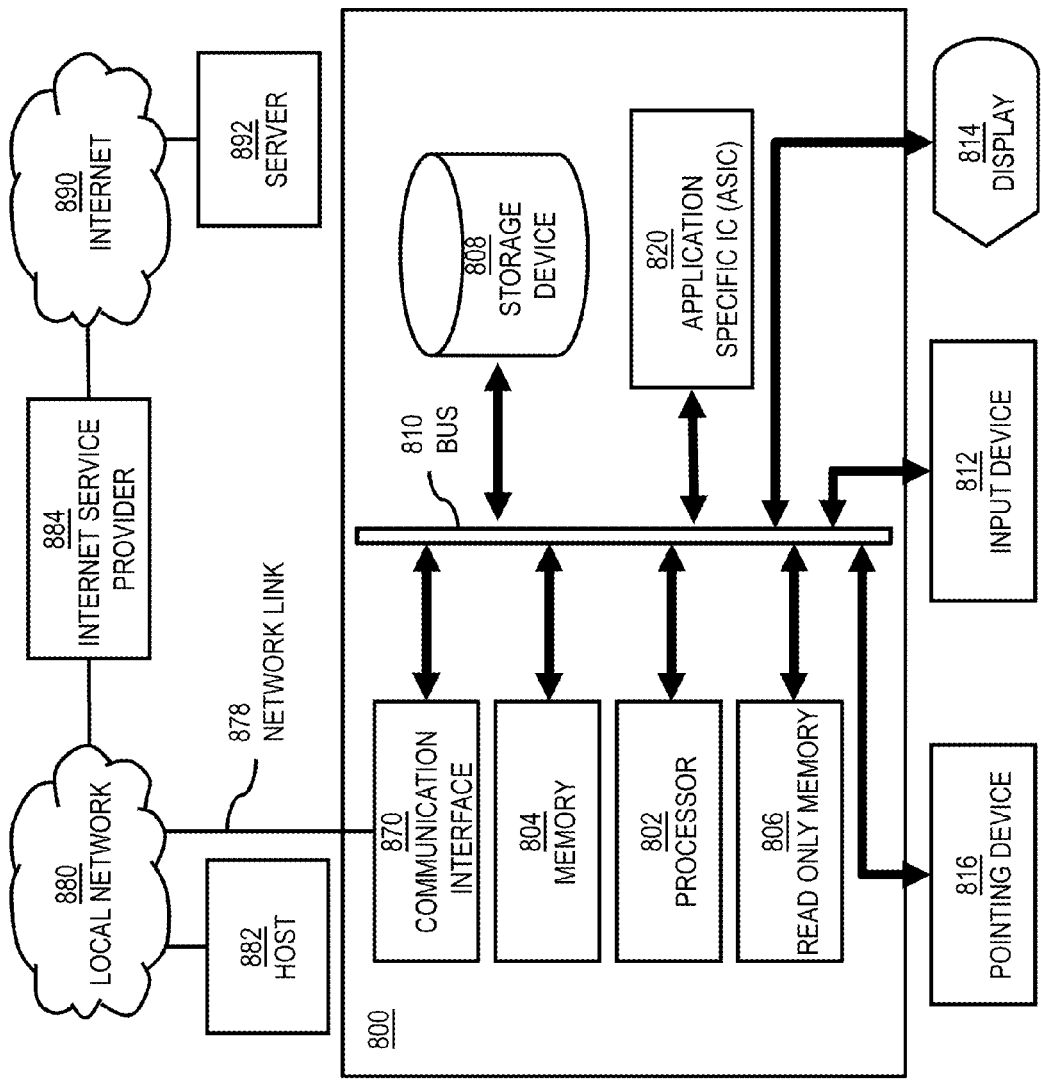
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to determine a new group of users based on the overlapping area of two or more existing groups and providing services and/or content to the users of the new group based on the services and content of the two or more existing groups as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of determining a new group of users based on the overlapping area of two or more existing groups and providing services and/or content to the users of the new group based on the services and content of the two or more existing groups.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to determine a new group of users based on the overlapping area of two or more existing groups and providing services and/or content to the users of the new group based on the services and content of the two or more existing groups. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for determining a new group of users based on the overlapping area of two or more existing groups and providing services and/or content to the users of the new group based on the services and content of the two or more existing groups. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for determining a new group of users based on the overlapping area of two or more existing groups and providing services and/or content to the users of the new group based on the services and content of the two or more existing groups, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for determining a new group of users based on the overlapping area of two or more existing groups and providing services and/or content to the users of the new group based on the services and content of the two or more existing groups to the UEs 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to determine a new group of users based on the overlapping area of two or more existing groups and providing services and/or content to the users of the new group based on the services and content of the two or more existing groups as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of determining a new group of users based on the overlapping area of two or more existing groups and providing services and/or content to the users of the new group based on the services and content of the two or more existing groups.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to determine a new group of users based on the overlapping area of two or more existing groups and providing services and/or content to the users of the new group based on the services and content of the two or more existing groups. The memory 905 also stores the data associated with or generated by the execution of the inventive steps.

Figure 10:
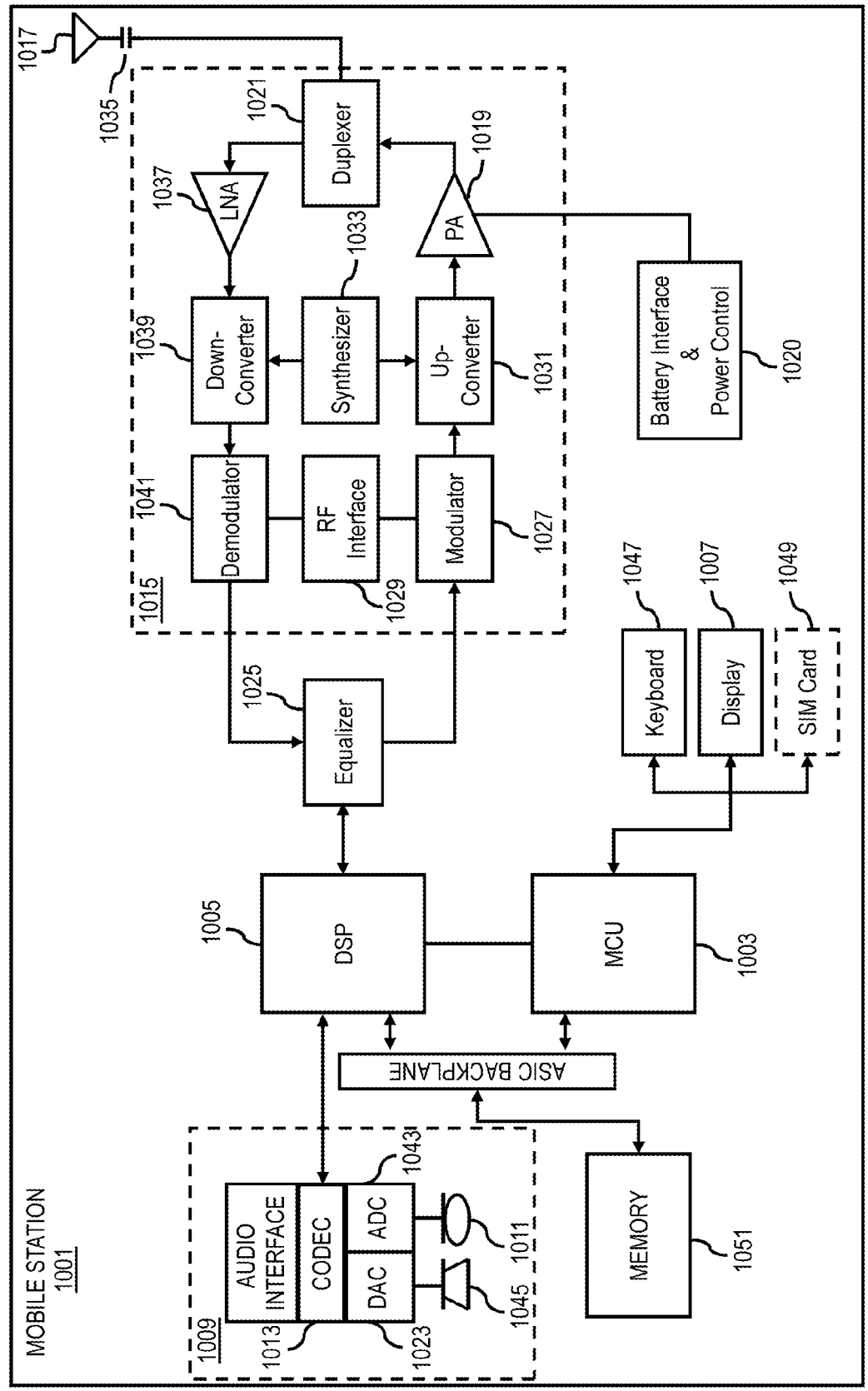
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of determining a new group of users based on the overlapping area of two or more existing groups and providing services and/or content to the users of the new group based on the services and content of the two or more existing groups. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of determining a new group of users based on the overlapping area of two or more existing groups and providing services and/or content to the users of the new group based on the services and content of the two or more existing groups. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to determine a new group of users based on the overlapping area of two or more existing groups and providing services and/or content to the users of the new group based on the services and content of the two or more existing groups. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining one or more shapes of one or more groups based, at least in part, on location information associated with one or more member devices of the one or more groups;
   presenting one or more representations of the one or more shapes in a location-based user interface;
   determining one or more applications, one or more content items, or a combination thereof being used at the one or more member devices;
   processing an overlapping area, the overlapping area between at least a first one of the one or more groups and at least a second one of the one or more groups;
   modifying an availability of the one or more applications, the one or more content items, or a combination thereof, to a new device entering the overlapping area based, at least in part, on the degree of overlap; and
   presenting one or more other representations of the one or more applications, the one or more content items, or a combination thereof in the location-based user interface.

2. A method of claim 1, further comprising:
   determining the one or more shapes so that one or more respective locations of the one or more member devices represent one or more vertices of the one or more shapes.

3. A method of claim 1, wherein the one or more applications, the one or more content items, or a combination thereof are collaborative, and further comprising:
   presenting of information for participating in a collaborative use of the one or more applications, the one or more content items, or a combination thereof.

4. A method of claim 1, further comprising:
   determining at least a third one of the one or more groups based, at least in part, on the overlapping area; and
   making available to the at least a third one of the one or more groups one or more combined applications, one or more combined content items, or a combination thereof based, at least in part, on the one or more applications, the one or more content items, or a combination thereof.

5. A method of claim 1, further comprising:
   determining at least one plurality of one or more gestures associated with the one or more member devices based, at least in part, on one or more sensors associated with the one or more member devices, user input, or a combination thereof; and
   making available or unavailable to the new device the one or more applications, the one or more content items, or a combination thereof based, at least in part, on the plurality of the one or more gestures.

6. A method of claim 5, further comprising:
   one or more radios associated with the one or more member devices to be hidden from the new device based, at least in part, on the determination to make the one or more applications, the one or more content items, or a combination thereof unavailable to the new device.

7. A method of claim 1, further comprising:
   presenting one or more large-scale media items based, at least in part, on at least one coordination of the one or more member devices.

8. A method of claim 1, further comprising:
   determining the one or more groups based, at least in part, on one or more physically collocated groups, one or more virtual groups, one or more groups of groups, or a combination thereof.

9. An apparatus comprising:
   at least one processor; and
   at least one memory including computer program code for one or more programs,
   the at least one memory and the computer program code configured to, with the at least one processor, cause the apparatus to perform at least the following,
      determine one or more shapes of one or more groups based, at least in part, on location information associated with one or more member devices of the one or more groups;
      cause, at least in part, a presentation of one or more representations of the one or more shapes in a location-based user interface;
      determine one or more applications, one or more content items, or a combination thereof being used at the one or more member devices;
      process an overlapping area, the overlapping area between at least a first one of the one or more groups and at least a second one of the one or more groups;
      modify an availability of the one or more applications, the one or more content items, or a combination thereof, to a new device entering the overlapping area based, at least in part, on the degree of overlap; and
      cause, at least in part, a presentation of one or more other representations of the one or more applications, the one or more content items, or a combination thereof in the location-based user interface.

10. An apparatus of claim 9, wherein the apparatus is further caused to:
    determine the one or more shapes so that one or more respective locations of the one or more member devices represent one or more vertices of the one or more shapes.

11. An apparatus of claim 9, wherein the one or more applications, the one or more content items, or a combination thereof are collaborative, the apparatus is further caused to:
   cause, at least in part, a presentation of information for participating in a collaborative use of the one or more applications, the one or more content items, or a combination thereof.

12. An apparatus of claim 9, wherein the computer program code of the apparatus is further caused to:
   determine at least a third one of the one or more groups based, at least in part, on the overlapping area; and
   determine to make available to the at least a third one of the one or more groups one or more combined applications, one or more combined content items, or a combination thereof based, at least in part, on the one or more applications, the one or more content items, or a combination thereof.

13. An apparatus of claim 9, wherein the new device has entered the overlapping area, the apparatus is further caused to:
   determine at least one plurality of one or more gestures associated with the one or more member devices based, at least in part, on one or more sensors associated with the one or more member devices, user input, or a combination thereof; and
   determine to make available or unavailable to the new device the one or more applications, the one or more content items, or a combination thereof based, at least in part, on the plurality of the one or more gestures.

14. An apparatus of claim 13, wherein the apparatus is further caused to:
   cause, at least in part, one or more radios associated with the one or more member devices to be hidden from the new device based, at least in part, on the determination to make the one or more applications, the one or more content items, or a combination thereof unavailable to the new device.

15. An apparatus of claim 9, wherein the apparatus is further caused to:
   cause, at least in part, a presentation of one or more large-scale media items based, at least in part, on at least one coordination of the one or more member devices.

16. An apparatus of claim 9, wherein the apparatus is further caused to:
   determine the one or more groups based, at least in part, on one or more physically collocated groups, one or more virtual groups, one or more groups of groups, or a combination thereof.

* * * * *